United States Patent
Makowsky

[11] Patent Number: 5,426,884
[45] Date of Patent: Jun. 27, 1995

[54] FISHING ROD HANDLE ASSEMBLY

[76] Inventor: Walter Makowsky, 3715 S. Wenonah, Berwin, Ill. 60402

[21] Appl. No.: 155,296

[22] Filed: Nov. 22, 1993

[51] Int. Cl.⁶ .............................................. A01K 87/00
[52] U.S. Cl. ......................................... 43/25.2; 43/25
[58] Field of Search ..................... 43/25.2, 25, 23, 22, 43/21.2, 18.1; 16/114 R, 115

[56] References Cited

U.S. PATENT DOCUMENTS

| | | | |
|---|---|---|---|
| 1,927,576 | 9/1933 | Smith | 242/84.5 |
| 2,244,585 | 6/1941 | Tweit | 16/114 R |
| 2,282,233 | 5/1942 | McFerron | 43/20 |
| 2,600,259 | 6/1952 | Palmer | 43/23 |
| 2,653,406 | 9/1953 | Grabiak et al. | 43/25 |
| 2,711,292 | 6/1955 | Taggart et al. | |
| 2,869,276 | 1/1959 | Hagen | 43/25 |
| 3,296,732 | 1/1967 | Magnus | 43/23 |
| 3,367,056 | 2/1968 | Johnson | 43/25 |
| 3,609,906 | 10/1971 | Johnson et al. | 43/18.5 |
| 3,949,817 | 4/1976 | Rice | 16/114 R |
| 4,027,419 | 6/1977 | Popeil | 43/18 R |
| 4,041,635 | 8/1977 | Savage | 43/25 |
| 4,651,461 | 3/1987 | Williams | 43/23 |
| 4,701,142 | 10/1987 | Merritt | 16/114 R |
| 4,958,407 | 9/1990 | Johnson | 16/114 R |

Primary Examiner—Kurt Rowan
Assistant Examiner—Chuck Y. Mah
Attorney, Agent, or Firm—Chuck Warren

[57] ABSTRACT

A supplementary handle is disposed above a top mounted reel to a fishing rod handle to permit a user to simultaneously grasp the supplementary handle with one hand and an axial rod handle with the other hand. A bracket mechanism mounts the supplementary handle to the fishing rod handle so that the supplementary handle is disposed above the top mounted reel and is spaced apart to allow space for a user's fingers to be placed between the supplementary handle and the reel. This provides the user with an additional holding mechanism for controlling the fishing rod thereby making the hand position change from casting to retrieving easily accomplished, and reducing undesired torque during line retrieval.

14 Claims, 3 Drawing Sheets

FISHING ROD HANDLE ASSEMBLY

BACKGROUND OF THE INVENTION

This invention is directed generally to fishing rod handles and is more specifically directed to fishing rod handles that accept a reel, such as a conventional casting or spin casting reel, mounted above the handle.

Various types of fishing rod handles have been developed to address different needs. Many types of handles have been proposed for use with spinning reels, i.e. a reel mounted below the rod handle with the line feed through eyelets on the bottom of the associated rod. In U.S. Pat. No. 2,600,259 to Palmer, a fishing rod handle for a spinning reel is disclosed which has the main portion of the handle that is grasped by the user above the spinning reel. Conventional spinning rods have handles which merely consist of an elongated extension of the rod with the reel mounted below the handle portion.

More complicated types of spinning rod handles have been proposed. For example, U.S. Pat. No. 3,296,732 to Magnus illustrates a handle which has an upward bend before a horizontal section where the reel is mounted and has a vertically extending portion rearward of the reel. The fishing rod handle disclosed in U.S. Pat. No. 4,651,461 to Williams consists of a U-shaped handle portion with one leg being along the longitudinal axis of the rod and the other leg, to which the reel is mounted, being spaced below the one leg.

Others have proposed an integrated rod and reel assembly such as the fishing rig described in U.S. Pat. No. 4,027,419 to Popeil. In this arrangement the reel is disposed inside an expanded handle portion with the normally grasped part of the handle rearward of the reel.

Conventional spin casting rods have a handle that is typically an elongated portion along the longitudinal axis of the rod. The handle has a rearmost portion usually made of cork or other material suited to be comfortably grasped by the user's fingers. Forward of the rearmost portion is a channel designed to receive the mounting flange of a spinning reel. A screw and clamping plate with a threaded hold that receives the screw secures the flange of the reel to the handle so that line is fed through eyelets on the top of the rod. A trigger shaped projection extends downward near the forward end of the rearmost portion which assists the user in holding the rearmost portion while being able to operate the release button with the thumb during a casting motion. While this type of handle has been widely used with spin casting reels, it is uncomfortable for many users to maintain the same grip used during casting while retrieving line, i.e. turning the crank that causes line to be retrieved into the reel.

For a right handed user of such a handle and casting reel, the reel is commonly mounted so that the crank is on the right side allowing the user to use the right hand to operate the crank. However, the right hand is also normally used to hold the rearmost portion of the handle during a cast with the right thumb used to control the reel during casting. Thus, after the cast has been completed, the user transfers the rearmost portion of the handle from the right to left hand so that the right hand can operate the crank. This is an awkward transition and becomes tiresome if casts are frequently made. Further the torque of holding the rearmost portion with the left hand while operating the crank with the right hand is undesirable.

SUMMARY OF THE INVENTION

It is an object of the invention to provide an improved handle assembly for spin casting reels that substantially overcomes the above deficiencies.

In an embodiment of the invention, a fishing rod assembly provides an additional holding mechanism for a fishing rod handle disposed to mount a spinning reel. A supplementary handle is disposed above the reel to permit a user to simultaneously grasp the supplementary handle with one hand and the axial rod handle with the other hand. A mounting mechanism mounts the supplementary handle to the fishing rod handle so that the supplementary handle is disposed above the reel and is spaced apart to allow space for a user's fingers to be placed between the supplementary handle and the reel when the fishing rod assembly is mounted to the fishing rod handle. This provides the user with an additional holding mechanism for controlling the fishing rod thereby making the hand position change from casting to retrieving easily accomplished, and reducing undesired torque during line retrieval.

DETAILED DESCRIPTION

Figure 1:
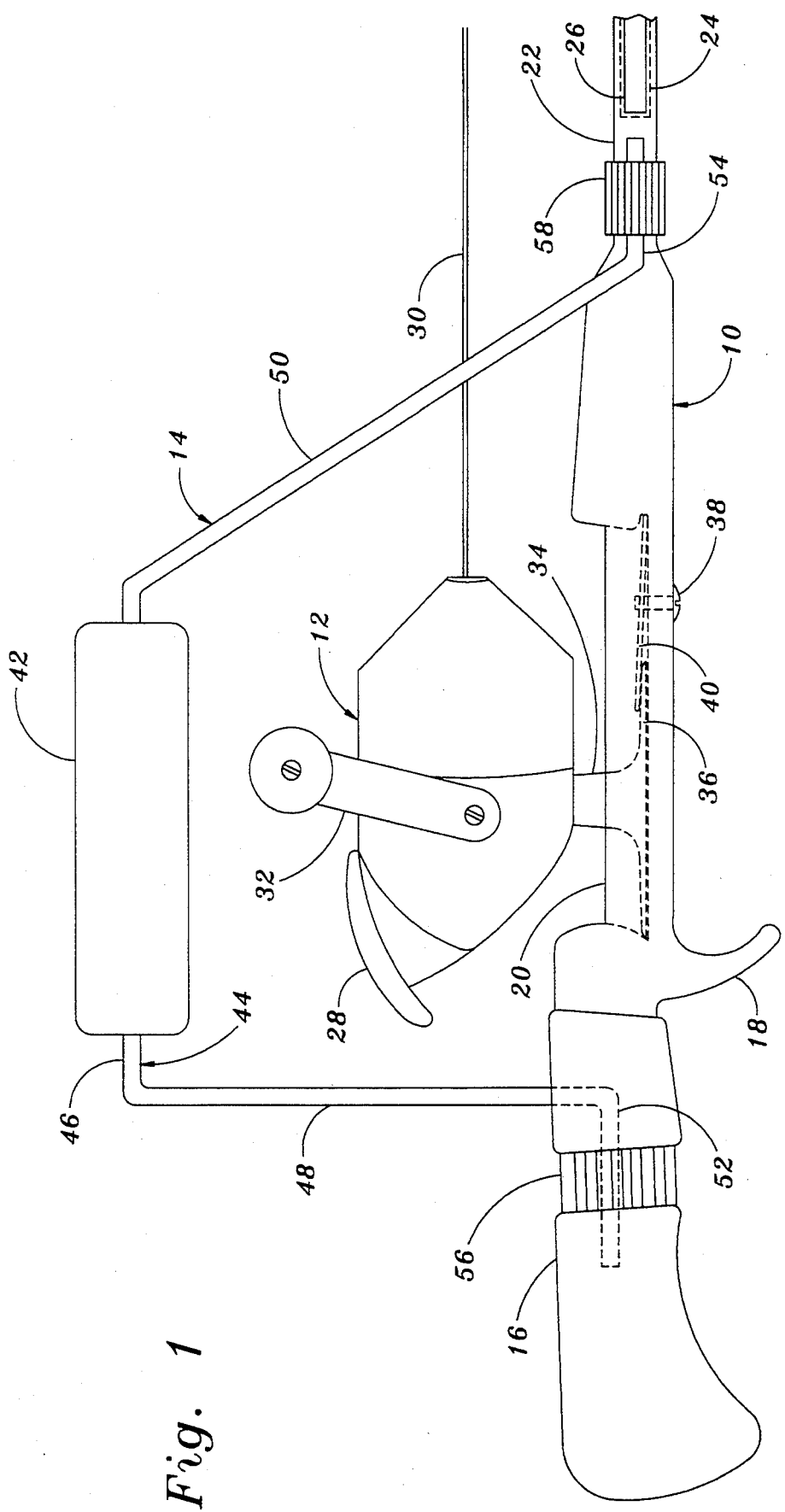
FIG. 1 is a side elevational view of an embodiment of the invention as mounted to a spinning rod handle.

Referring to FIG. 1, a handle 10 for a fishing rod has a top mounted reel 12 and a supplementary handle assembly 14 mounted to it. The handle 10 includes a rearmost portion 16 which may be made of cork and is preferably dimensioned to conform to the user's hand. A trigger shaped projection 18 extends from the primary body of the handle is made of metal or plastic. The user's first finger is normally wrapped around projection 18 for a better grip during casting. A channel 20 in the handle 10 accepts the reel 12. A forward portion 22 of the handle 10 includes an elongated recess 24 that receives the rod 26.

The spin casting reel 12 includes a release button 28 disposed at the top rear portion of the reel which is used in the known manner for releasing fishing line 30 at the proper time during the casting motion. A crank assembly 32, shown mounted to the right side of the reel for use by the user's right hand, is rotated by the user to pick up or retrieve line back into the reel. Bracket 34 of reel 12 includes a bottom flange 36 which forms a base used to secure the reel to the channel 20 of handle 10.

A reel mounting assembly includes a screw 38 which threadedly engages a plate like clamp dimensioned to fit within the channel 20 and apply a downward force on the flange 36 to captivate the reel 12 to the handle 10.

As used herein a "top mounted reel" means a fishing reel such as a conventional spin casting reel or bait casting reel which is mounted above the longitudinal axis of the fishing rod when the handle is held in the normal usage orientation. The embodiments of the present invention are particularly suited for use with fishing rod handles that hold a top mounted reel.

The supplementary handle assembly 14 includes an elongated handle 42 which is preferably made of a material that is durable and comfortable when gripped by the user such as cork. A bracket 44, such as made of relatively stiff metal rod, has a horizontal portion 46 to which handle 42 is attached, a rearward leg 48, and a forward leg 50. The distal ends 52 and 54 of legs 48 and 50, respectively, are relatively horizontal, i.e. parallel to the longitudinal axis of the rod 26 and handle 10. As seen in FIG. 1, end 54 is attached to the right side of handle 10 forward of reel 12 and end 52 is attached to the left side of handle 10 rearward of reel 12. In the exemplary embodiment hose clamp 56 secures end 52 to the rearmost portion 16 of handle 10 and hose clamp 58 secures end 54 to the body of handle 10. It will be apparent that various other means for mounting supplementary handle assembly 14 to handle 10 can be used. To facilitate the attachment of assembly 14, handle 10 can be manufactured with integrally formed recesses, projections, or latching means suited to engage the ends of the assembly to make for easy attachment. Of course, the ends of the assembly could also be formed with shapes or mechanisms to assist in the mounting of the assembly.

Figure 2:
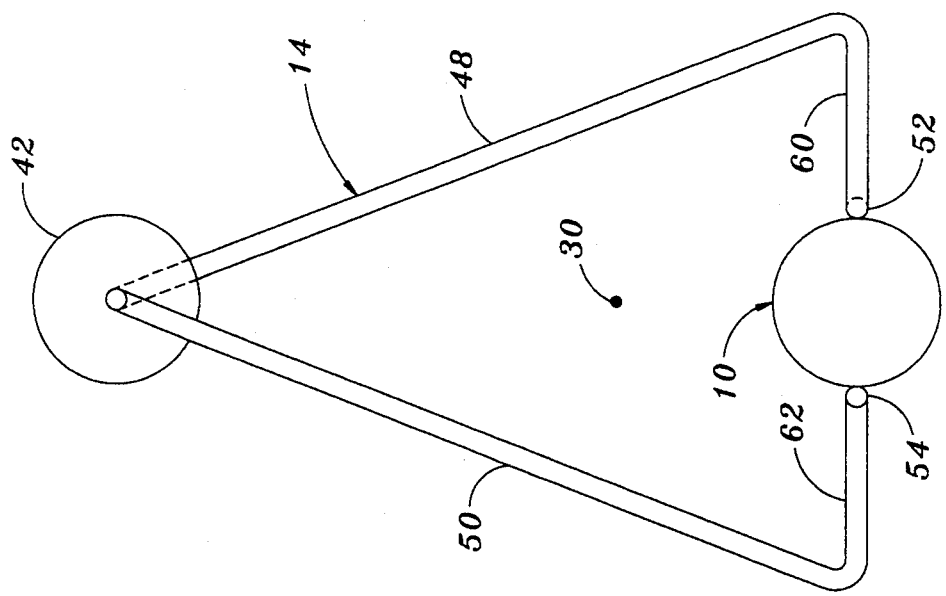
FIG. 2 is a partial end view along line 2—2 of FIG. 1 showing the supplementary handle and mounting bracket.

FIG. 2 is a partial view of FIG. 1 seen from line 2—2; the assembly 14 is shown relative to handle 10 with details of the reel not shown for clarity. Legs 48 and 50 flare outward as they approach the handle 10 and have horizontal portions 60 and 62, respectively, that project back towards the handle 10. This flaring gives the user more room to operate the reel 12 including easy access to release button 28 and crank 32.

Handle 42 is preferably mounted directly above and in alignment with reel 12, i.e. the axis of handle 42 being parallel to the axis of the rod 26, handle 10, and reel 12, and in the plane defined by the latter three axes. This minimizes undesired torque when the handle 42 is used to control the rod and reel of FIG. 1. Since handle 42 is disposed closer (laterally) to the center of gravity than the rearmost portion 16 of the handle 10, it provides a better position from which to apply control forces. Having one leg 50 mounted forward of the reel and the other leg 48 rearward of the reel enables the user to exert a generally upward force on leg 50 while exerting a concurrent downward force on leg 48 to generate a counterclockwise torque (as seen in FIG. 1) on the handle 10 and rod 26. Applying such forces with the left hand while operating the crank with the right hand makes repetitive casting and retrieving much easier than having to hold the rearmost portion 16 in the left hand.

The embodiment of the invention makes the transition from casting to retrieving easier as compared with the need to transfer the rearmost portion 16 from the right hand to the left hand after a cast. Without the illustrative embodiment, the user has to release the right hand grip while simultaneously establishing a left hand grip on the same rearmost portion 16 which is often not long enough to allow the left hand to grip the handle serially behind the right hand. Using the embodiment of the invention, the user can hold the rearmost portion 16 in the right hand and perform a one handed cast. Following the cast, the user keeps the right hand in place and grasps the handle 42 with the left hand. Now the user is free to release the right hand grip and use the right hand to operate the crank 32.

Figure 4:
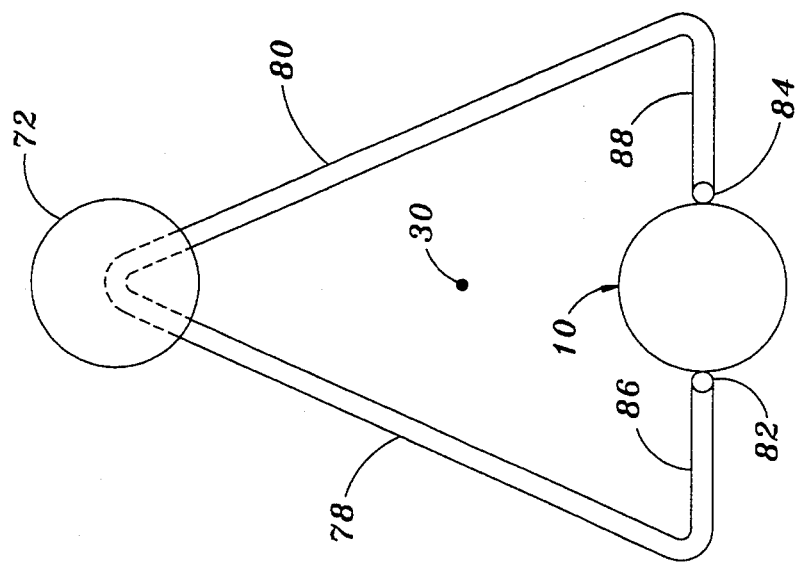
FIG. 4 is a partial end view along line 4—4 of FIG. 3 showing the supplementary handle and mounting bracket.
Figure 3:
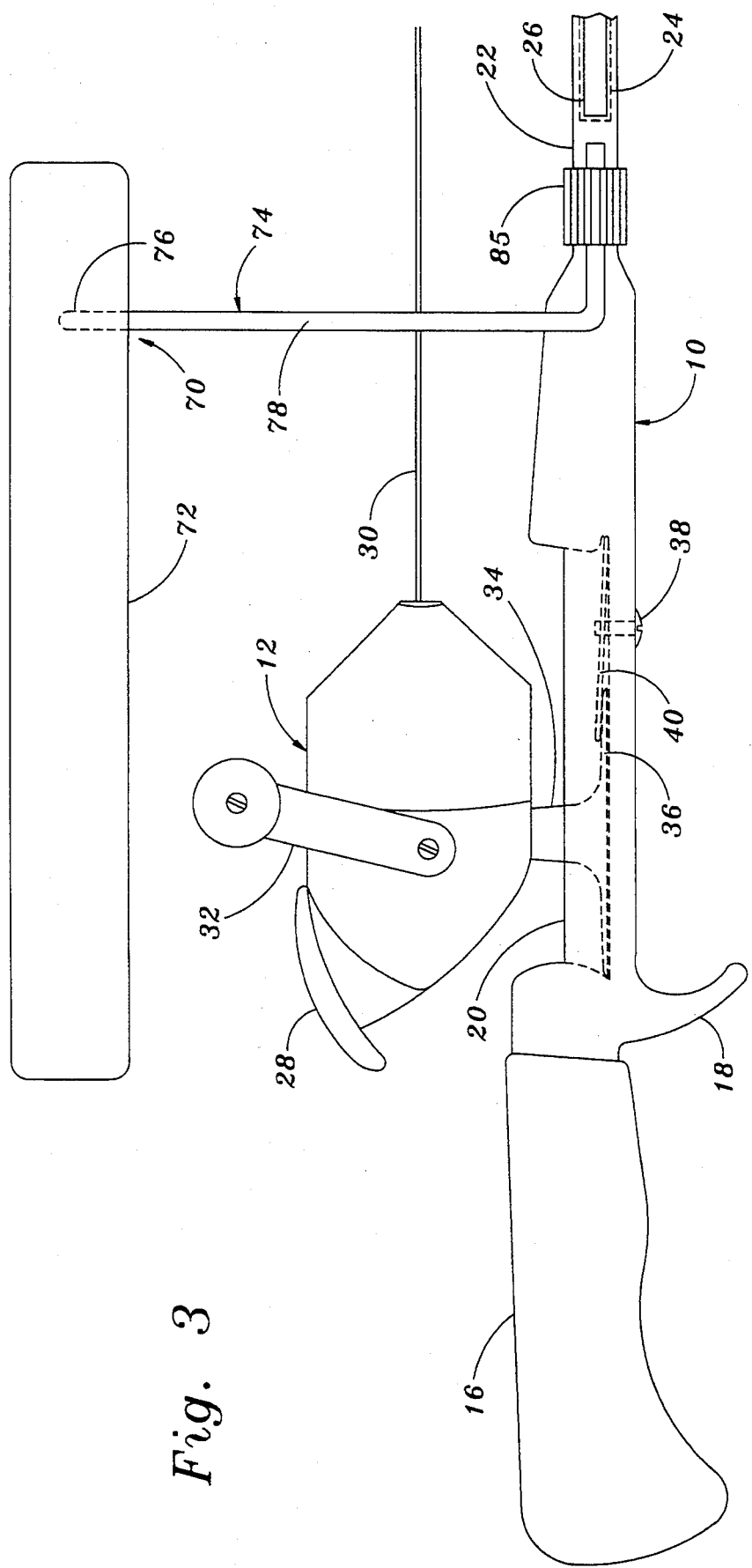
FIG. 3 is a side elevational view of another embodiment of the invention as mounted to a spinning rod handle.

FIGS. 3 and 4 show another embodiment of the invention in which common elements with the embodiment shown in FIGS. 1 and 2 have like reference numerals. The supplementary handle assembly 70 includes an elongated handle 72 which is preferably made of a material that is durable and comfortable when gripped by the user such as cork. A bracket 74, such as made of relatively stiff metal rod, has an apex portion 76 to which handle 72 is attached, a right leg 78, and a left leg 80. The distal ends 82 and 84 of legs 78 and 80, respectively, are relatively horizontal, i.e. parallel to the longitudinal axis of the rod 26 and handle 10. In this embodiment both distal ends are attached to the handle 10 forward of reel 12 such as by a single hose clamp 85. Legs 78 and 80 flare outward as they approach the handle 10 and have horizontal portions 86 and 88, respectively, that project back towards the handle 10. The flaring of the legs 78 and 80 gives the user more room to operate the reel 12 including easy access to release button 28 and crank 32.

Handle 72 is preferably mounted directly above and in alignment with reel 12, i.e. the axis of handle 42 being parallel to the axis of the rod 26, handle 10, and reel 12, and in the plane defined by these axes. This provides many of the advantages described for the embodiment of FIG. 1, except that the lack of an attached support member behind the reel negates the ability to apply torque relative to it.

The exemplary embodiments of the present invention provide advantages as compared with the use of a conventional fishing rod handle. Undesired torque is minimized by the supplementary handle is used to control the rod and reel. Since the supplementary handle is disposed closer (laterally) to the center of gravity than the normally used rearmost portion of the handle, it provides a better position from which to apply control forces. The transition from casting to retrieving is made easier as compared with the need to transfer the rearmost portion of the conventional handle from the right hand to the left hand after a cast. The embodiment as shown in FIG. 1 can be modified to accommodate a left handed fisherman by switching legs 48 and 50 left to right so that the rear leg is left and the front leg 50 right of the rod as seen in FIG. 2. This would leave the left side of the rod as seen by the fisherman clear so that the left hand can be used to operate a left mounted crank on the reel. Also the embodiment of FIG. 3 can be mounted to the rod so that the handle 72 is not centered over the reel, i.e. an intentional left or right orientation relative to the center position. This positioning may be desired depending on the personal preferences of the fisherman.

Although embodiments of the invention have been described above and shown in the drawings, the scope of the invention is defined by the claims which follow.

What is claimed is:

1. A fishing rod handle assembly that provides an additional holding mechanism for an elongate fishing rod handle having a reel attaching mechanism disposed to attach a top mounted reel to the fishing rod handle, the reel controlling a fishing line extended substantially parallel to and along an elongate fishing rod attached to the fishing rod handle, the fishing rod handle having a fore end that is attached to the fishing rod and an aft end opposite the fore end, the fishing rod handle assembly comprising:

supplementary handle being elongated and dimensioned to be grasped by a user's hand, the supplementary handle having forward and rearward ends oriented to correspond respectively to the fore and aft ends of the fishing rod handle;

bracket means for supporting said supplementary handle relative to the fishing rod handle; and means for mounting said bracket means to the fishing rod handle so that said supplementary handle is disposed above the reel attaching mechanism and is spaced apart from the fishing rod handle to allow space for a user's fingers to be placed between said supplementary handle and the reel when the fishing rod handle assembly is mounted to the fishing rod handle, thereby providing the user with an additional holding mechanism for controlling an associated rod and reel, said bracket means including a first bracket attached to said forward end of the supplementary handle and to said fishing rod handle, said first bracket is disposed forward of the reel, has a shape which avoids contact with the extended fishing line, and supports said supplementary handle so that the elongate axis of the supplementary handle is substantially within a plane defined by the elongate axis of the fishing rod handle and the extended fishing line.

2. The assembly according to claim 1 wherein said bracket means further comprises a second bracket attached to the rearward end of the supplementary handle and to the fishing rod handle rearward of the reel, said second bracket having a shape that permits unobstructed access by the user's hand to facilitate casting.

3. The assembly according to claim 2 wherein said first and second brackets facilitate transmitting an upward force on the fishing rod handle, relative to the aft end of the fishing rod handle is response to a user applying an upward force to the forward end of said supplementary handle relative to the rearward end of said supplementary handle, said upward force induced by one hand of the user that holds the supplementary handle thus allowing the user to simultaneously operate a crank of the reel with the other hand while maintaining the fishing rod at a desired angle relative to horizontal.

4. The assembly according to claim 3 wherein said mounting means comprises a first and second clamp that holds the distal ends of said first and second brackets to the fishing rod handle.

5. The assembly according to claim 2 wherein said second bracket is bent in a plane substantially perpendicular to the axis of the fishing rod handle so that the second bracket is disposed a distance away from the rear of the reel to allow unobstructed access to the rear of the reel by the user during casting.

6. The assembly according to claim 1 wherein said bracket means comprises means for transmitting an upward force forward of the reel attaching mechanism relative to the rear of the reel attaching mechanism in response to a user applying an upward force to the forward end of said supplementary handle relative to the rearward end of said supplementary handle.

7. The assembly according to claim 1 wherein said first bracket is bent in a plane substantially perpendicular to the longitudinal axis of the fishing rod handle and the extended fishing line so that the first bracket is disposed a distance away from the fishing line.

8. A fishing rod handle assembly comprising:

elongate fishing rod handle that accepts at its fore end a fishing rod and includes a reel attaching mechanism disposed to mount a top mounted reel to the fishing rod handle;

means for providing a user with a means for exerting control forces to said fishing rod handle from above a longitudinal axis of the fishing rod handle, said providing means including:

supplementary handle being elongated and dimensioned to be gripped by a user's hand, said supplementary handle having a forward end disposed forward of the reel and a rearward end disposed rearward of the reel;

bracket means for supporting said supplementary handle to the fishing rod handle so that said supplementary handle is disposed above said reel attaching mechanism and is spaced apart from said fishing rod handle to allow space for a user's fingers to be placed between said supplementary handle and the reel when the reel is mounted to said fishing rod handle, said bracket means including a first bracket attached to said forward end of the supplementary handle and to said fishing rod handle, said first bracket is disposed forward of the reel, has a shape which avoids contact with a fishing line extending from the reel along and parallel to the fishing rod; and means for mounting said bracket means to the fishing rod handle.

9. The assembly according to claim 8 wherein said bracket means supports said supplementary handle so that the elongate axis of the supplementary handle is substantially within a plane defined by the elongate axis of the fishing rod handle and the extended fishing line.

10. The assembly according to claim 8 wherein said bracket means further comprises a second bracket attached to the rearward end of the supplementary handle and to the fishing rod handle rearward of the reel, said second bracket having a shape that permits unobstructed access to the rear of the reel by the user's hand to facilitate casting.

11. The assembly according to claim 10 wherein said first and second brackets in combination with the supplementary handle facilitates transmitting an upward force forward of the reel relative to the rear of the reel in response to a user applying an upward force to the forward end of said supplementary handle relative to the rearward end of said supplementary handle, said first bracket coupling said upward force from said supplementary handle to the fishing rod handle relative to said second bracket.

12. The assembly according to claim 10 wherein said mounting means comprises a first and second clamp that holds the distal ends of said first and second brackets to the fishing rod handle.

13. The assembly according to claim 8 wherein said bracket means disposes said supplementary handle so that the longitudinal axis of the supplementary handle is substantially in a plane defined by the longitudinal axes of the fishing rod and the fishing line.

14. The assembly according to claim 8 wherein said first bracket comprises a first and second support leg each having a distal end, said mounting means attaching the distal end of said first and second legs forward of the reel attaching mechanism to the fishing rod handle.

* * * * *